April 29, 1952 — T. E. LYNCH — 2,594,947
MAGNETIC TESTING APPARATUS
Filed Oct. 30, 1946
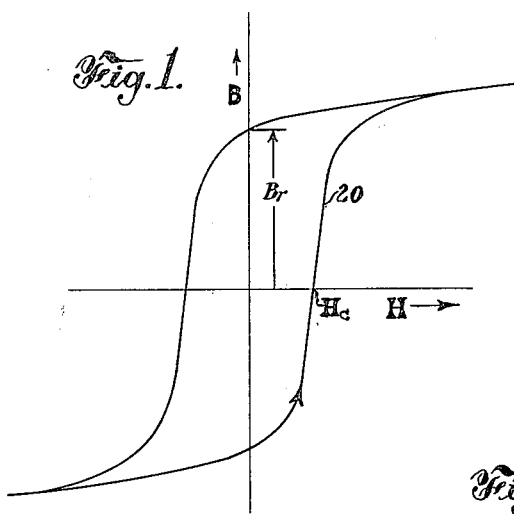
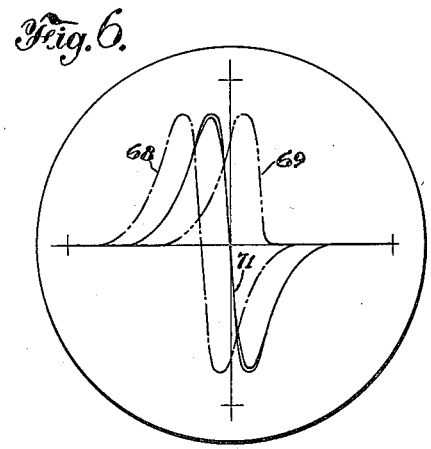
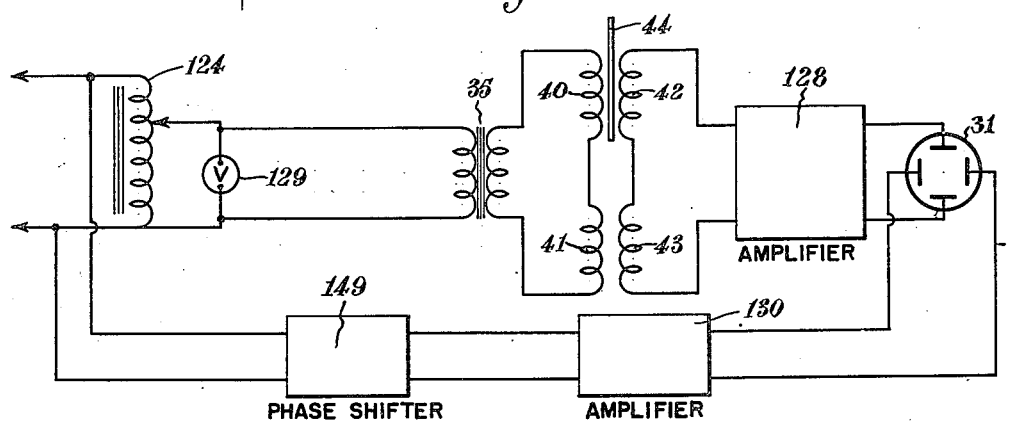
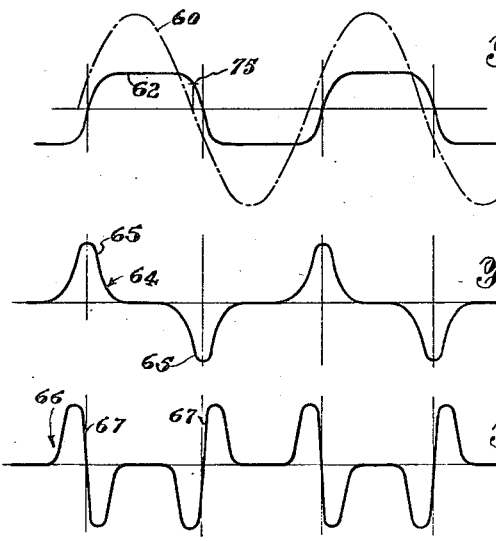
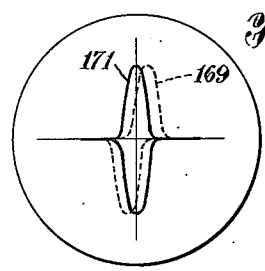
INVENTOR.
T. E. LYNCH
BY Pineles & Greene
ATTORNEYS

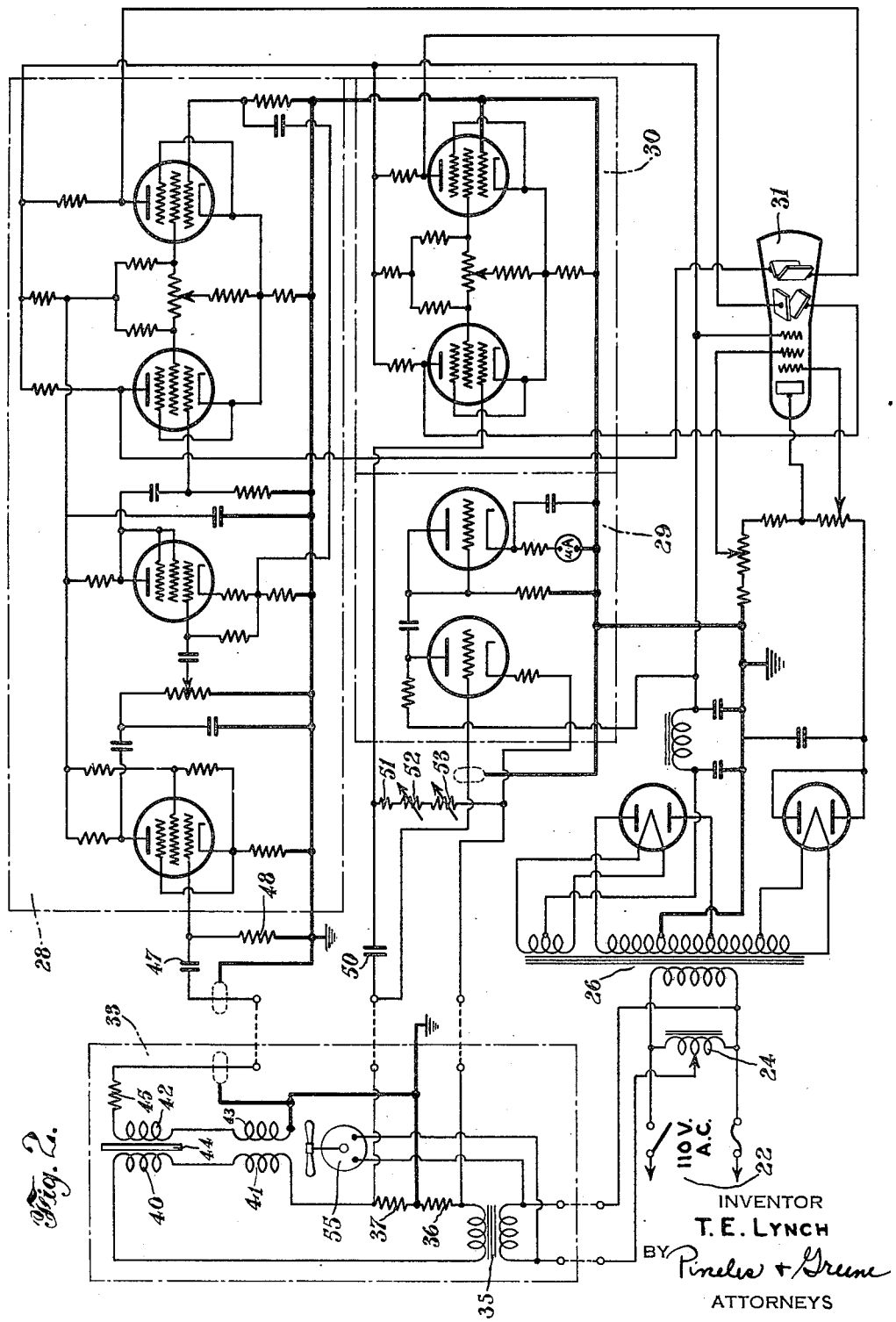

April 29, 1952     T. E. LYNCH     2,594,947
MAGNETIC TESTING APPARATUS
Filed Oct. 30, 1946     3 Sheets-Sheet 3
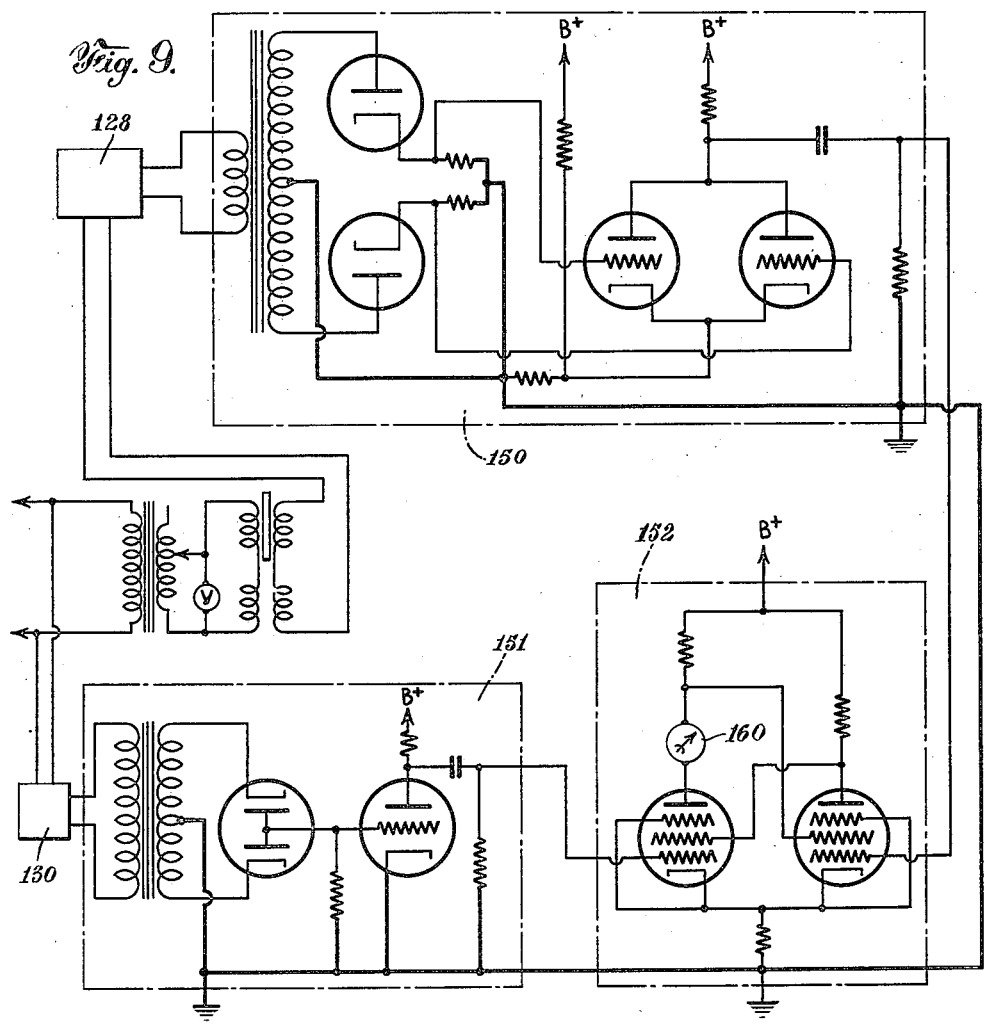
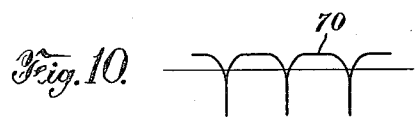
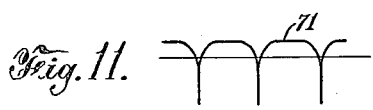
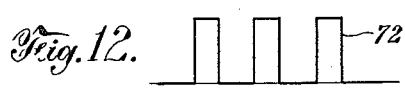
INVENTOR.
T. E. LYNCH
BY Pineles + Greene
ATTORNEYS Patented Apr. 29, 1952

2,594,947

UNITED STATES PATENT OFFICE 2,594,947

MAGNETIC TESTING APPARATUS

Thomas E. Lynch, Cleveland, Ohio, assignor to The Brush Development Company, Cleveland, Ohio, a corporation of Ohio Application October 30, 1946, Serial No. 706,635

20 Claims. (Cl. 175—183)

This invention relates to the measurement of the magnetic characteristic of magnetic material.

Among the objects of this invention is the provision of an apparatus with which the magnetic characteristics of a sample of magnetic material may be simply and rapidly determined without resorting to calculations or comparative determinations.

The foregoing and other objects of the invention will be best understood from the following description of exemplifications thereof, reference being had to the accompanying drawings wherein:

Fig. 1 is a typical hysteresis curve of magnetic material;

Fig. 2 diagrammatically illustrates one form of a coercive force measuring apparatus according to the invention;

Fig. 3 is a curve diagram illustrating the action in one portion of the apparatus of Fig. 2;

Fig. 4 is a curve diagram further illustrating the action in the apparatus of Fig. 2;

Fig. 5 is another curve diagram illustrating the action in another portion of the apparatus of Fig. 2;

Fig. 6 illustrates the operation of the apparatus of Fig. 2;

Fig. 7 is a diagrammatic representation of another form of measuring apparatus according to the invention;

Fig. 8 illustrates the operation of the apparatus of Fig. 7.

Fig. 9 a diagrammatic representation of a still further form of measuring apparatus embodying the invention; and Figs. 10, 11 and 12 illustrate the operation of the apparatus of Fig. 9.

The simple and rapid measurement of the magnetic characteristics of magnetic materials is a great convenience if not a necessity in the investigation of the relative merits of various magnetic materials. Wherever the ability of the material to retain permanent magnetization is concerned, the coercive force characteristic provides a reliable measure of the usefulness of the material. For example, in the selection of permanently magnetizable material to be used in elongated form for the record track on which magnetic recordings are made and from which the recording is played back, the investigation of many materials and many determinations of coercive force are necessary. In the control of the manufacture of permanent magnet materials, the simple and rapid coercive force determination is also valuable.

The coercive force of magnetic material is defined as the demagnetizing force required to reduce the magnetic induction from a state of saturation to zero. In Fig. 1 the hysteresis curve 20 indicates the variation of the induced magnetic flux B with the magnetizing force H; and Hc, where the curve 20 crosses the H axis, determines the coercive force.

One apparatus according to the invention is diagrammatically illustrated in Fig. 2 and includes power supply leads 22 that may be plugged into the conventional A. C. power line and are connected to the variable autotransformer 24 and the power transformer 25. The power transformer 25 is connected to the more-or-less conventional rectifying system shown to provide the D. C. voltages supplied to the amplifiers 26, 30 and cathode ray tube 31. The power transformer 25 through connections not shown also provides filament current for the various tube filaments.

The adjustable output of the autotransformer 24 is connected to a test assembly 33 containing a step-down transformer 35 the output of which is led through two small resistors 36, 37 of equal value to a pair of similar coils 40, 41. In the magnetic field of the coils 40, 41 are placed two similar pick-up coils 42, 43, the turns of which are oppositely directed and connected in series and through a resistor 45 to a differentiating network shown as consisting of a capacitor 47 and resistor 48. The differentiated voltage is taken from across the resistor 48, amplified by passage through the amplifier 28 and fed to the vertical deflection plates of the cathode ray tube 31.

The distant ends of the adjoining resistors 36, 37 are connected with a phase shifting network shown as consisting of a capacitor 50 and resistors 51, 52 and 53, resistors 52 and 53 being variable. The phase shifted output is taken from the resistors, amplified by passage through the amplifier 30 and fed to the horizontal deflection plates of the cathode ray tube 31.

Measuring circuit 29 may be provided for amplifying, rectifying and measuring the output from the resistors 36, 37. A cooling means such as the fan 55 may be provided for preventing undue heating within the coils 40 and 42.

In use, magnetizing currents are supplied by step-down transformer 35 and there are induced in the coils 42, 43 voltages which are equal and opposite when the magnetic fields of all the coils 40, 41, 42 and 43 exist in a uniform non-magnetic medium, such as air. The opposition and cancellation of the voltages takes place because the turns of coil 42 are wound oppositely to those of coil 43. However, when a magnetic member is placed in the field of one of the coils 40 or 41, the voltages induced in the coils 42 and 43 will no longer balance and the unbalance will be essentially the voltage induced by the magnetic flux in the magnetic member.

In Fig. 3 is shown two curves, the curve 60 indicating the magnetizing current flowing through one of the coils 40, 41 plotted as ordinates against time as abcissa. The magnetizing force in the field of this coil is proportional to this magnetizing current and may also be indicated by the same curve 60. The curve 62 indicates the magnetic flux induced in the magnetic member placed in the field of the coil, plotted as ordinate against the same time abcissa. It is noted that the induced flux lags behind the magnetizing force and that the amount of lag, at the points where the curves cross the time axis, is the measure of the coercive force; the height of the magnetizing force curve at the time when the induced flux is zero is the coercive force itself.

The voltage induced in the pick-up coils 42, 43 by the presence of the magnetic material to be tested in the field of one of the coils is proportional to the rate of change of the induced magnetic flux, as is well known. In Fig. 4, curve 64 indicates the variation of the voltage induced in the pick-up coils 42, 43 plotted as ordinate against the time abcissa of Fig. 3. All points on curve 64 represent the slope or rate of change at the corresponding points on curve 62 having the same position on the time axis.

The differentiating network 47, 48 is adjusted to be of such character that a voltage impressed on network 47, 48 causes a current to flow through a high impedance capacitor 47 and a low impedance resistor 48. The current passed by a capacitor is directly proportional to the rate of change of the voltage and when the relative impedances of the capacitor and resistor are adjusted so that the impedance of the resistor is a very small and negligible fraction of the total impedance, the current passed by the capacitor-resistor combination will also be substantially directly proportional to the rate of change of the impressed voltage. The voltage across the ends of the resistor 48 is directly proportional to the current flowing through the resistor and therefore represents the rate of change or derivative of the impressed voltage with respect to time. The differentiated voltage is illustrated in Fig. 5 by the curve 66 having the surge cycles 67 and every point on the curve indicate the slope or rate of change of the corresponding point in curve 64 with respect to time.

When the amplified voltage wave of Fig. 5 is applied to the vertical deflection plates of a cathode ray tube and scanned by a sine wave or similar voltage in phase with the magnetizing force or current (curve 60) and applied to the horizontal plates of the same cathode ray tube, the trace appearing on the screen of the cathode ray tube will look like the dotted curves 68, 69 in Fig. 6. This is explained by considering the horizontally sweeping electron beam as being at the extreme right of the screen at the moment when the magnetizing force curve 60 is at its positive peak and being at the extreme left at the moment when the magnetizing curve is at its minimum peak. At every portion of the sweep the electron beam is directed above or below the horizontal center of the screen in a manner corresponding to the similar deviations of the surge cycles 67 of curve 66 at the same instant. One surge cycle 67 is reproduced on the screen as dash-dot curve 68 during the right-to-left portion of the sweep as the magnetizing force curve 60 goes from a positive peak to the next negative peak, and another surge cycle is reproduced as the dash-double-dot curve 69 when the sweep retraces from a negative peak of the magnetizing force curve 60 to the next positive peak. The image persistance on the cathode ray screen as well as the persistance of vision render both traces 68 and 69 visible together.

It will be noted that inasmuch as the curve 62 lags behind the curve 60 the two traces 68 and 69 do not coincide. However, by delaying the sweep voltages, as by passing the magnetizing force indicating voltage through the delaying network 50, 51, 52, 53 the two traces 68 and 69 may be made to coincide to form the substantially single trace shown by the solid line curve 71 in Fig. 6. The amount of delay effected in the delaying network is exactly that amount necessary to move curve 60 along the time axis by an amount equal to the coercive force being measured, so that the knob of one of the adjustable resistors 52, 53 may be fitted with a pointer moving across a scale calibrated as and marked "coercive force." The other adjustable resistor may be used as a calibrating resistor.

The apparatus is used by connecting the power supply and inserting a suitably shaped sample 44 inside one of the coils 40, 41, as shown. After the warm-up period is completed the autotransformer output is adjusted to provide a predetermined output as indicated by the measuring circuit 29. A meter in this circuit may have a special mark on its dial and the adjustment may be made to bring the meter needle to this mark. With the vertical gain of the cathode ray tube set to any suitable value the cathode ray tube screen trace is varied by adjusting one of the adjustable resistors 52, 53 until the almost vertical lines of the trace coincide and the trace looks like curve 71 of Fig. 6. The coercive force is then read directly from the position of the adjusting resistor. For highest accuracy the apparatus should be permitted to come to thermal equilibrium, the maximum magnetizing force should be much higher than the largest coercive force to be measured and the samples tested should be properly shaped. A maximum magnetizing force of four times the maximum coercive force has been found to give very good results. Radical change in the shape of the samples tested may necessitate recalibration of the apparatus.

The phase shifting is effected by the capacitor-resistor circuit of Fig. 2 by applying the voltage to be shifted to the capacitor 54 and resistors 51, 52, 53, all in series, and taking the shifted voltage output from the common capacitor-resistor connection and the mid-point of the source of the voltage to be shifted, which is shown as grounded in the figure. This type of phase-shifting network is more fully described in an article by Cosins beginning on page 190 of the Wireless Engineer, vol 12, 1935. Other phase-shifting networks, such as an inductor-resistor circuit may be used in place of the one shown, as is well known in the art. The phase-shifted output is shown as applied to the two grids of the push-pull vacuum tube amplifier 30, the cathode to ground degeneration in the tube fed by the ungrounded grid providing a convenient phase-splitting arrangement. By way of illustration, the application of a signal to the ungrounded grid with respect to ground will cause the cathode of the same tube to follow the signal voltage with respect to ground at a smaller amplitude and in the same phase. Both cathodes being tied together, the grounded grid of the other tube of the push-pull pair will have a voltage with respect to its cathode of the opposite phase as compared with the corresponding voltage of the ungrounded grid with respect to its cathode.

The measurements of the apparatus of Fig. 2 are completely independent of the gain of the amplifiers 28 and 30 or the characteristics of the cathode ray tube 31.

If desired, the horizontal and vertical plate connection from the cathode ray tube 31 to the amplifiers 30 and 28, respectively, may be interchanged, in which case the traces 68, 69 and 71 will be rotated through 90 degrees on the screen but the operation would not be changed in any other respects. Additionally, the voltage used to indicate the magnetizing force need not be taken from the magnetizing current itself but may be taken from the voltage supplied to the coils 40, 41. For such use the D. C. resistance of these coils should be kept low as compared with their A. C. impedance and compensation made for the 90 degree phase separation between the voltage impressed on the coils and the current through them. The indicating voltage may also be taken from the larger voltage supplied to the step-down transformer 35 in which case the 180 degree phase separation between the voltage input to and the voltage output of a transformer must be compensated for. A 180 degree phase compensation may be made by merely reversing the connections to a pair of the deflecting plates of the cathode ray tube 31. Reversing the connections to the horizontal deflection plates, for example, will cause the reversed sweeping voltage to deflect to the right where the original voltage would have deflected it to the left, thus acting as if the original voltage peaks were inverted.

Without in any way limiting the invention, and for the purpose of enabling those skilled in the art to construct the apparatus, a specific example of magnetizing and pick-up coils 40, 41, 42 and 43, suitable for determining the coercive force of samples in the shape of wires or filaments is given. The magnetizing coils 40, 41 each have approximately 1200 turns extending over 8.4 centimeters on a form, the internal diameter of the turns being 1.4 centimeters. The pickup coils 42, 43 each consisted of 5000 turns extending over 1.9 centimeters on a form providing an internal coil diameter of about 0.2 centimeters. The pick-up coils are centrally and coaxially mounted inside the magnetizing coils, the form on which the pick-up coils are wound being tubular and extending out to provide easily accessible passageways for the insertion of the samples to be tested.

This coil construction provides a uniform magnetizing field over the portion occupied by the pick-up coil, and samples as long as two centimeters or longer give highly reproducible results. It is obvious, however, that other coil constructions may be used, especially if measurements are to be made on samples having different shapes.

If the out-put of the opposed pick-up coils is not zero in the absence of the sample, another variable mutual inductance may be inserted in the magnetizing and pick-up circuits to balance the out-put, but this refinement is not essential. This variable mutual inductance may also be used to balance the out-put from a single magnetizing-pick-up coil assembly. When, however, tests are to be made on samples having a highly magnetic coating on a slightly magnetic backing, the coil assembly of Fig. 2 is desirable, the uncoated backing being inserted in one coil when the coated sample is tested in the other.

Coercive force measurements may be carried out on wire as it is being formed, by threading the wire through the pick-up coil or coil form, moving the wire through the testing apparatus as it is being made and watching or recording the setting of the coercive force measuring phase-shifting resistor. By setting the resistor at the position required for a pre-determined wire standard, a shifting of the cathode ray traces will give immediate indication as to whether or not the wire is up to, above, or below standard.

It is understood, of course, that the apparatus may be used with elongated magnetizing members, such as tapes or filaments having a non-circular cross-section in the same manner as described above for wire.

Furthermore, the apparatus is versatile in that testing may be effected with the test assembly 33 located at any distance from the amplifiers 28, 30 and the remainder of the structure, the dotted line connection shown in the figure being incorporated in a suitable connection means, such as a cable. The grounded dotted loops encircling connections in Fig. 2 indicate shielding which may be necessary with some constructions.

Fig. 7 illustrates another apparatus according to the invention. The magnetizing coils 40, 41, the pick-up coils 42, 43 and the sample 44 are disposed as in the apparatus of Fig. 2, but the voltage output indicated by the curve 64 in Fig. 4 is not differentiated, being directly passed through an amplifier 128 and fed to the vertical plates of the cathode ray tube 31. The sweeping voltage is taken from the input to the variable autotransformer 124 through the adjustable phase shifter 149, amplifier 130 and then to the horizontal deflection plates of the cathode ray tube 31. Voltmeter 129 is shown as connected for indicating the suitable autotransformer adjustment.

The operation of the apparatus of Fig. 7 is similar to that of Fig. 2 inasmuch as the voltage at the input to autotransformer 24 is 180 degrees displaced in phase with respect to the voltage fed to the step-down transformer 35 and the input to the step-down transformer 35 is 180 degrees displaced in phase with respect to the voltage applied to the magnetizing coils 40, 41. The two displacements add up to a total of 360 degree displacement which is not distinguishable from a zero displacement. The trace on the screen of the cathode ray tube 31 of Fig. 7, however, is as shown by curve 169 in Fig. 8 corresponding to the curve 64 in Fig. 4 and the trace is adjusted to align the surges or current variation lobes 65 as indicated by curve 171 in Fig. 8.

In Fig. 9 there is shown a modification of the invention in which a cathode-ray tube need not be used.

According to this modification a suitable current indicating device such as a current meter is connected, so that the coercive force for example may be directly indicated by the position of the indicator of the current meter. Alternatively, the current indicating device may have a calibrated point or series of points and a phase-shifting network may be employed for bringing the current indicator to one of the fixed points and reading the position of the phase-shifting means, in a manner similar to that indicated above in connection with Fig. 2 for example.

The circuit shown in Fig. 9 may be generally similar to that shown on Fig. 7 differing in that, in place of the cathode-ray tube 31, there are provided electrical networks generally indicated as 150 and 151 together with a combined meter and triggering circuit generally indicated as 152. Network 150 converts the signal picked up from the material being tested to a pulse sequence, such as is shown by curve 70 in Fig. 10, wherein the pulses may correspond to a desired portion of the magnetic flux variation.

Network 151 converts the signal corresponding to the magnetizing current into a different pulse sequence, such as is shown by curve 71 in Fig. 11, wherein the pulses may correspond to a desired portion of the magnetizing current variation.

Each pulse sequence is fed to the meter and triggering circuit 152 where the pulses of one sequence may be utilized to initiate a current indicating condition in the meter, and the pulses of the other sequence may terminate the current indicating condition.

The pulses formed in network 150 may for example correspond to the peaks of the curve 64 shown in Fig. 4, and the pulses formed by network 151 may correspond to the zero current conditions of the magnetizing current variations represented by curve 60 in Fig. 3.

The pulses of each sequence will accordingly be spaced with respect to the time axis by a distance proportional to the magnitude of the coercive force, and the current pulses through the meter may be indicated by the square pulse wave 72 of Fig. 12, in which the length of each pulse is proportional to the coercive force.

The meter 160 may be relied on as providing enough inertia so as to indicate only the average current passing. If desired, however, filtering means may be added to smooth the current pulses to any extent, ranging from slight to complete filtering.

It appears obvious that the average current passing will vary directly as the duration of each current pulse of curve 72, so that the average current indicated by the meter can, by suitable calibration of the meter scale, be a direct indication of the coercive force of the meter tested.

With the circuit as described above, the phase-shifting network 149 need not be used, but as indicated above, only one or more points of the meter scale may be calibrated and the phase-shifting network 149 may be employed in the manner shown above in connection with Fig. 2. The meter 160 may for example have merely a zero current point calibrated, in which case the meter merely acts as a null indicator to determine when the phase-shifting network 149 causes the time intercepts of curve 60 and the peaks of curve 64 to occur at the same instant.

The pulse forming networks 150 and 151 illustrated diagrammatically in Fig. 9 show one convenient arrangement for effecting the desired results. It is obvious, however, that any other pulse forming networks may be used. For example the well known peaking transformer together with a full wave rectifier may be substituted for the pulse forming network 151. Similarly, the output of amplifier 128 may be integrated so as to produce a signal corresponding to curve 62 of Fig. 3 and this signal may also be passed through a peaking transformer and full wave rectifier to produce the pulse sequence illustrated in Fig. 10.

If desired the pulse sequences may be passed through pulse sharpening circuits to improve the pulse shape. Additionally automatic volume controls or limiters may be employed so as to obtain pulses of constant magnitude, if it is desired that the current pulses of Fig. 12 be entirely independent of their amplitude.

The triggering circuit shown at 152 is also only one convenient form of possible triggering circuits. If desired, thyratron controls may be employed. One to initiate a flow of current through the meter 160 upon triggering by the pulses of the sequence taken from the magnetizing curve 60, and the other thyratron being triggered by the pulses of the sequence taken from curve 64 or 62 to terminate the current surge through the first thyratron and meter 160. The pulses of the pulse sequences should be electrically positive with respect to the zero voltage axis for effective thyratron control.

Other variations may be made within the scope of the invention, such as for example, merely using half-wave rectification in the pulse forming networks, so that the pulse frequency is halved. Such change may effect the average current through the meter, and its calibration may change, but will not otherwise effect the operation of the apparatus. Where the current initiating pulse frequency is halved the current terminating pulse frequency need not be halved to halve the current pulses.

Pulse sequences may be made with the pulses corresponding to other portions of the signal variations as for example by passing the signals directly through pulse-sharpening networks to sharpen the peaks.

The pulse sequences 70 and 71 may be fed to other indicators, such as a cathode-ray tube, where the interval between the pulses of the different sequences may be readily measured.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

I claim:

1. An apparatus for measuring the coercive force of magnetic materials comprising: electrical magnetizing means for applying a varying magnetizing field to, and for producing a varying magnetic flux in, the magnetic material to be tested; tracing means for producing a trace corresponding to the variations in magnetic flux produced in the magnetic material; trace sweeping means for sweeping the trace in proportion to the varying magnetizing field; phase shifting means for changing the phase of the trace sweep so as to cause alignment of the swept trace variations.

2. An apparatus for measuring the coercive force of magnetic materials comprising: electrical magnetizing means for applying a varying magnetizing field to, and for producing a varying magnetic flux in, the magnetic material to be tested; inductance means responsive to the varying magnetic flux in the magnetic material for producing an electrical signal corresponding to the rate of change of the magnetic flux; signal tracing means for producing a trace corresponding to the electrical signal; trace sweeping means for sweeping the signal trace in proportion to the varying magnetizing field; phase shifting means for changing the phase of the trace sweep so as to cause alignment of the swept signal trace variations and coercive force meter means connected to said phase shifting means to determine the coercive force phase angle between the magnetizing variations and the magnetization produced by them.

3. An apparatus for measuring the coercive force of magnetic materials comprising: electrical magnetizing means for applying a varying magnetizing field to, and for producing a varying magnetic flux in, the magnetic material to be tested; inductance means responsive to the varying magnetic flux in the magnetic material for producing an electrical signal corresponding to the rate of change of the magnetic flux; means for differentiating said electrical signal; signal tracing means for producing a trace corresponding to the first derivative of the electrical signal with respect to time; trace sweeping means for sweeping the signal trace in proportion to the varying magnetizing field; phase shifting means including means calibrated in coercive force for changing the phase of the trace sweep so as to cause alignment of the swept signal trace inflections and thereby determine the coercive force phase angle between the magnetizing variations and the magnetization produced by them.

4. An apparatus for measuring the coercive force of magnetic materials comprising: electrical magnetizing means for applying a varying magnetizing field having a maximum value at least about four times the coercive force being measured to, and for producing a varying magnetic flux in, the magnetic material to be tested; inductance means responsive to the varying magnetic flux in the magnetic material for producing an electrical signal corresponding to the rate change of the magnetic flux, differentiating means connected to said inductance means for differentiating said electrical signal; tracing means connected to said differentiating means for producing a trace corresponding to the variations in magnetic flux produced in the magnetic material; trace sweeping means connected to said electrical magnetizing means for sweeping the trace in accordance with the varying magnetizing field; phase shifting means connected between said electrical magnetizing means and said trace sweeping means for changing the phase of the trace sweep so as to cause alignment of the swept trace variations.

5. An apparatus for measuring the coercive force of magnetic materials comprising: electrical magnetizing means for applying a varying magnetizing field having a maximum value at least about four times the coercive force being measured, and varying as the sine function of time to, and for producing a varying magnetic flux in, the magnetic material to be tested; inductance means responsive to the varying magnetic flux in the magnetic material for producing an electrical signal corresponding to the rate change of the magnetic flux, differentiating means connected to said inductance means for differentiating said electrical signal; tracing means connected to said differentiating means for producing a trace corresponding to the variations in magnetic flux produced in the magnetic material; trace sweeping means connected to said electrical magnetizing means for sweeping the trace in accordance with the varying magnetizing field; phase shifting means connected between said electrical magnetizing means and said trace sweeping means for changing the phase of the trace sweep so as to cause alignment of the swept trace variations.

6. An apparatus for measuring the coercive force of magnetic materials comprising: electrical magnetizing means for applying a varying magnetizing field having a maximum value at least about four times the coercive force being measured, and varying as the sine function of time to, and for producing a varying magnetic flux in, the magnetic material to be tested; inductance means responsive to the varying magnetic flux in the magnetic material for producing an electrical signal corresponding to the rate of change of the magnetic flux; differentiating means connected to said inductance means; signal tracing means connected to said differentiating means for producing a trace corresponding to the electrical signal; trace sweeping means connected to said electrical magnetizing means for sweeping the signal trace in proportion to the varying magnetizing field; phase shifting means including means calibrated in coercive force connected between said electrical magnetizing means and said trace sweeping means for changing the phase of the trace sweep so as to cause alignment of the swept signal trace variations and thereby determine the coercive force phase angle between the magnetizing variations and the magnetization produced by them.

7. An apparatus for measuring the coercive force of magnetic materials comprising: electrical magnetizing means for applying a varying magnetizing field having a maximum value at least about four times the coercive force being measured, and varying as the sine function of time to, and for producing a varying magnetic flux in, the magnetic material to be tested; inductance means responsive to the varying magnetic flux in the magnetic material for producing an electrical signal corresponding to the rate of change of the magnetic flux; means for differentiating said electrical signal; signal tracing means for producing a trace corresponding to the first derivative of the electrical signal with respect to time; trace sweeping means for sweeping the signal trace in proportion to the varying magnetizing field; phase shifting means including means calibrated in coercive force for changing the phase of the trace sweep so as to cause alignment of the swept signal trace inflections and thereby determine the coercive force phase angle between the magnetizing variations and the magnetization produced by them.

8. The apparatus of claim 6 in which cooling means is provided for preventing the undue heating of the magnetic material.

9. The apparatus of claim 7 in which cooling means is provided for preventing the undue heating of the magnetic material.

10. The apparatus of claim 1 further characterized by a resistor in the magnetizing circuit across which the trace sweeping means is connected so as to be controlled by the voltage drop therein.

11. The apparatus of claim 6 further characterized by a resistor in the magnetizing circuit across which the trace sweeping means is connected so as to be controlled by the voltage drop therein.

12. The apparatus of claim 7 further characterized by a resistor in the magnetizing circuit across which the trace sweeping means is connected so as to be controlled by the voltage drop therein.

13. The apparatus of claim 1 in which the tracing means includes an oscilloscope.

14. The apparatus of claim 6 in which the tracing means includes an oscilloscope.

15. The apparatus of claim 7 in which the tracing means includes an oscilloscope.

16. The apparatus of claim 2 in which the electrical magnetizing means includes two coils only one of which receives the magnetic material to be tested and the inductance means opposes the signal induced from one coil against the signal induced from the other.

17. An apparatus for measuring magnetic characteristics of magnetic materials comprising: an electric energizing circuit and electrical magnetizing means supplied by magnetizing current from said circuit for applying a varying magnetizing field to, and producing a varying magnetic flux in, a given magnetic material to be tested; tracing means for producing a trace in accordance with the magnetic condition of the material tested, said tracing means including one circuit portion inductively coupled to said magnetized material for deriving one signal corresponding to the level of a magnetic characteristic of the tested material and another circuit portion for deriving another signal corresponding to the voltage across a circuit portion supplying said magnetizing current, the trace including portions spaced by a distance representing a magnetic characteristic to be measured; and trace shifting means having different settings for adjusting the trace so that the distance between the said spaced portion may be determined merely by the setting of the trace shifting means.

18. An apparatus for measuring magentic characteristics of magnetic materials comprising: electrical magnetizing means for applying a varying magnetizing field to, and producing a varying magnetic flux in, the magnetic material to be tested; electrical pick-up means for generating a first pulsed signal corresponding to the variations of magnetic flux in the material to be tested and including differentiating means for differentiating said generated signal; electrical circuit means for generating and carrying a second pulsed signal corresponding to the varitations of the magnetizing field which produced said variations of magnetic flux in said material; electrical translating apparatus for directly indicating the difference between portions of said first signal and correlated portions of said second signal and, by this difference, a magnetic characteristic of the material to be tested.

19. The apparatus of claim 18 in which the electrical translating means includes a current meter which is connected for initiating an indication of current at the desired portions of the second signal and for terminating the indication of current at the corresponding portions of the first signal.

20. The apparatus of claim 18 in which the electrical translating means is a cathode-ray tube on which the said difference is traced.

THOMAS E. LYNCH.

REFERENCES CITED

The following references are of record in the file of this patent:

UNITED STATES PATENTS

| Number | Name | Date |
|---|---|---|
| Re. 21,003 | Knerr et al. | Feb. 14, 1939 |
| 1,686,815 | Imes | Oct. 9, 1928 |
| 1,897,634 | De Forest | Feb. 14, 1933 |
| 2,010,189 | Hallowell | Aug. 6, 1935 |
| 2,028,486 | Zuschlag | Jan. 21, 1936 |
| 2,035,248 | Scott | Mar. 24, 1936 |
| 2,098,991 | Zuschlag | Nov. 16, 1937 |
| 2,162,009 | Goldsmith | June 13, 1939 |
| 2,283,742 | Leonard | May 19, 1942 |
| 2,329,811 | Zuschlag | Sept. 21, 1943 |
| 2,337,231 | Cloud | Dec. 21, 1943 |
| 2,360,857 | Eldredge | Oct. 24, 1944 |
| 2,440,984 | Summers | May 4, 1948 |

OTHER REFERENCES

Electronics, August 1946, pages 114–121.